(12) United States Patent
Li et al.

(10) Patent No.: US 7,356,071 B2
(45) Date of Patent: Apr. 8, 2008

(54) METHOD AND APPARATUS FOR ESTIMATING SIGNAL-TO-NOISE RATIO BASED ON DEDICATED PHYSICAL CHANNEL PILOT SYMBOLS

(75) Inventors: Bin Li, Ronkonkoma, NY (US); Rui Yang, Greenlawn, NY (US); Gregory S. Sternberg, Mt. Laurel, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 150 days.

(21) Appl. No.: 11/153,967

(22) Filed: Jun. 16, 2005

(65) Prior Publication Data

US 2006/0251152 A1   Nov. 9, 2006

Related U.S. Application Data

(60) Provisional application No. 60/678,647, filed on May 6, 2005.

(51) Int. Cl.
*H04B 1/00* (2006.01)

(52) U.S. Cl. ............... 375/147; 375/140; 340/539.21; 370/320; 370/335; 455/67.13; 455/134; 455/226.2; 455/226.3

(58) Field of Classification Search ............... 375/140, 375/141, 148, 265, 295, 340, 349, 316; 455/69, 455/427, 454, 522, 67.11, 442, 452.1, 562.1; 370/335, 470
See application file for complete search history.

(56) References Cited

U.S. PATENT DOCUMENTS

2003/0125040 A1*  7/2003  Walton et al. .............. 455/454

2004/0264604 A1*  12/2004  Malette et al. .............. 375/340

OTHER PUBLICATIONS

3GPP TS 25.211 "Third Generation Partnership Project; Technical Specification Group Radio Access Network; Physical Channels and Mapping of Transport Channels onto Physical Channels (FDD)", Release 5; V5.4.0, Jun. 2003.

3GPP TS 25.214 "Third Generation Partnership Project; Technical Specification Group Radio Access Network; Physical Layer Procedures (FDD)", Release 5; V5.5.0, Jun. 2003.

* cited by examiner

*Primary Examiner*—David C. Payne
*Assistant Examiner*—Adolf DSouza
(74) *Attorney, Agent, or Firm*—Volpe & Koenig, P.C.

(57) ABSTRACT

The present invention is related to a method and apparatus for estimating signal-to-noise ratio (SNR) based on dedicated physical channel (DPCH) pilot symbols in a wireless communication system. A receiver receives a DPCH transmission and a despreader despreads the received DPCH transmission. A selector selects pilot symbols in the despread DPCH transmission. A signal power estimator estimates signal power based on the pilot symbols, and a noise power estimator estimates noise power based on the received DPCH transmission. A SNR estimator estimates an SNR based on the signal power estimation and the noise power estimation. The noise power estimator may calculate the noise power estimation either based only on pilot symbols or based on both pilot symbols and non-pilot symbols. The DPCH transmission may be transmitted using more than one antenna for transmit diversity.

12 Claims, 2 Drawing Sheets

METHOD AND APPARATUS FOR ESTIMATING SIGNAL-TO-NOISE RATIO BASED ON DEDICATED PHYSICAL CHANNEL PILOT SYMBOLS

CROSS REFERENCE TO RELATED APPLICATION

This application claims the benefit of U.S. provisional application No. 60/678,647 filed May 6, 2005, which is incorporated by reference as if fully set forth.

FIELD OF INVENTION

The present invention is related to wireless communication systems. More particularly, the present invention is related to a method and apparatus for estimating signal-to-noise ratio (SNR) based on dedicated physical channel (DPCH) pilot symbols in a wireless communication system.

BACKGROUND

In a wireless communication system, such as a wideband code division multiple access (WCDMA) system, a downlink power control scheme is implemented to reduce the interference between wireless transmit/receive units (WTRUs). The WTRU estimates the SNR of the received signal, and then compares this estimated SNR with a threshold. When the estimated SNR is higher than the threshold, the WTRU generates a power control bit and sends it to a Node-B to reduce the transmit power. When the estimated SNR is lower than the threshold, the WTRU generates a power control bit and sends it to the Node-B to increase the transmit power. Although this scheme operates adequately, it is based on the ability to accurately estimate the SNR.

SUMMARY

The present invention is related to a method and apparatus for estimating SNR based on DPCH pilot symbols in a wireless communication system. A receiver receives a DPCH transmission and a despreader despreads the received DPCH transmission. A selector selects pilot symbols in the despread DPCH transmission. A signal power estimator estimates signal power based on the pilot symbols, and a noise power estimator estimates noise power based on the received DPCH transmission. A SNR estimator estimates an SNR based on the signal power estimation and the noise power estimation. The noise power estimator may calculate the noise power estimation either based only on pilot symbols or based on both pilot symbols and non-pilot symbols. The DPCH transmission may be transmitted using more than one antenna for transmit diversity.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

The features of the present invention may be incorporated into an integrated circuit (IC) or be configured in a circuit comprising a multitude of interconnecting components.

Figure 1:
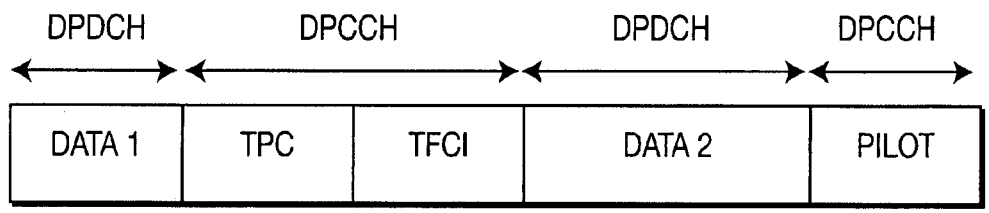
FIG. 1 is a block diagram of a prior art time slot structure for downlink DPCH.

In accordance with the present invention, DPCH transmissions are used to estimate the received signal SNR that will be used for power control bit generation. FIG. 1 is a block diagram of a prior art time slot structure of the downlink DPCH in a WCDMA system transmitted from a base station to a WTRU. The data information, which comprises a dedicated physical data channel (DPDCH), and control information, which comprises a dedicated physical control channel (DPCCH), are multiplexed in the time domain. The control information includes transmit power control (TPC), transport format combination index (TFCI) and pilot information.

Figure 2:
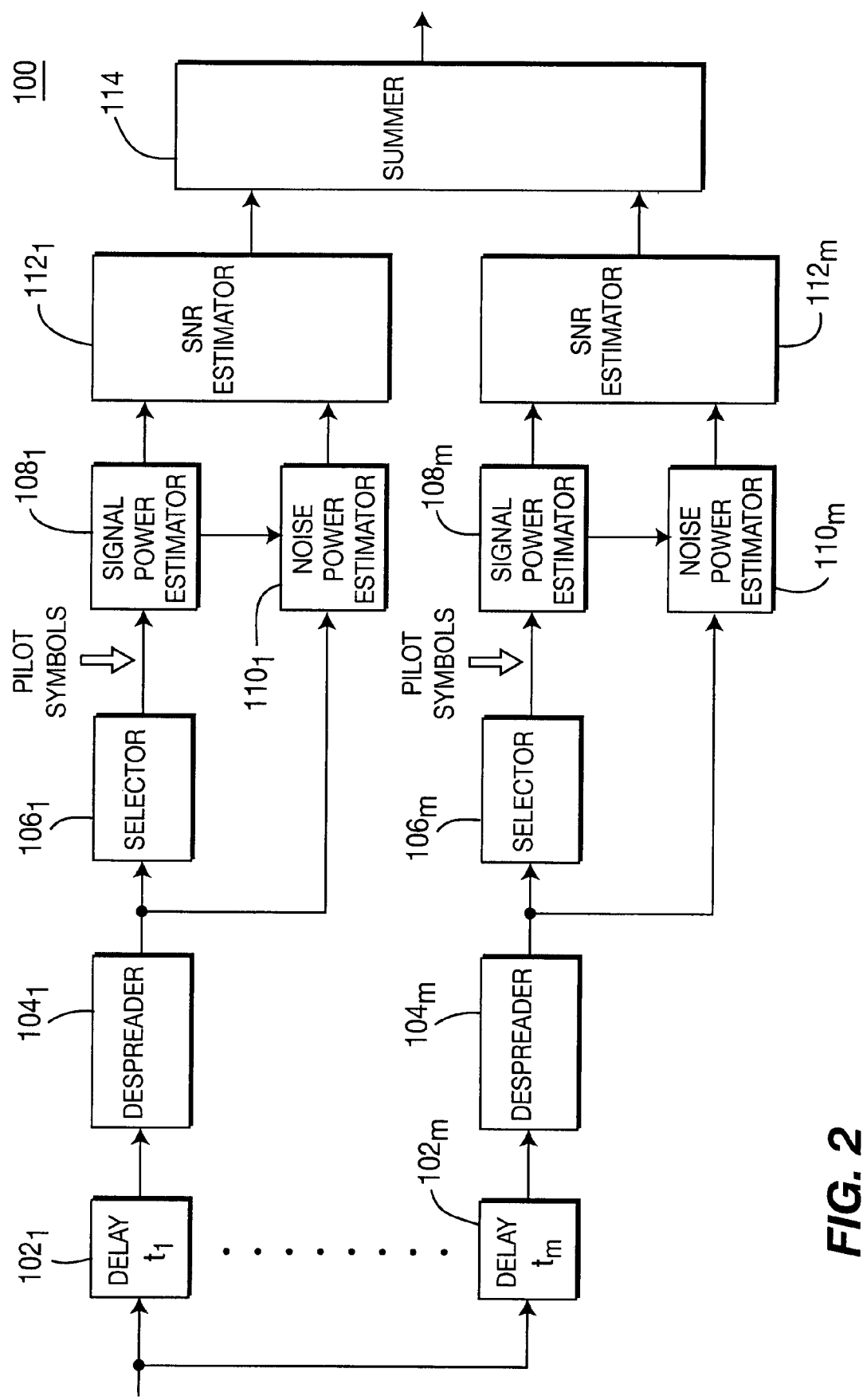
FIG. 2 is a block diagram of an apparatus for estimating SNR in accordance with the present invention.

FIG. 2 is a block diagram of an apparatus 100 for estimating SNR in accordance with a preferred embodiment of the present invention. The apparatus 100 of FIG. 2 utilizes a Rake receiver to combine multipath components. Due to the nature of the dispersive wireless channel, the received signals include a plurality of replicas, (i.e., multipath components), of the transmitted signals. Two or more strong multipath components are processed by Rake fingers, respectively. It should be noted that the configuration of the apparatus shown in FIG. 2 is provided as an example and the present invention may be implemented with or without Rake receiver.

The apparatus 100 comprises a plurality of delay units $102_1$-$102_m$, a plurality of despreaders $104_1$-$104_m$, a plurality of selectors $106_1$-$106_m$, a plurality of signal power estimators $108_1$-$108_m$, a plurality of noise power estimators $110_1$-$110_m$, a plurality of SNR estimators $112_1$-$112_m$, and a summer 114. Received DPCH transmissions are forwarded to the delay units $102_1$-$102_m$ and delayed by each delay unit $102_1$-$102_m$ to be aligned in time domain in accordance with the detected location of each multipath component. Each delayed version of the received signal is despread by the despreader $104_1$-$104_m$ to obtain transmitted symbols.

Suppose that $v_1^m, v_2^m, \ldots, v_N^m$ are all N despread symbols for $m^{th}$ delay, (i.e., $m^{th}$ finger), in one time slot. Among them, the first $N_1$ symbols are non-pilot symbols and the last $N_2$ symbols are pilot symbols, where $N=N_1+N_2$. The selector $106_1$-$106_m$ selects the pilot symbols and outputs the pilot symbols to the signal power estimator $108_1$-$108_m$, and optionally to the noise power estimator $110_1$-$110_m$.

The signal power estimator $108_1$-$108_m$ receives pilot symbols from the selector $106_1$-$106_m$ and estimates the signal power from the pilot symbols. The signal power can be estimated as follows:

$$P_m = \left| \frac{1}{N_2} \sum_{k=1}^{N_2} v_{N_1+k}^m \left(s_{N_1+k}^m\right)^* \right|^2 ; \quad \text{Equation (1)}$$

where $S_{N_1+k}^m$ ($1 \leq k \leq N_2$) are known pilot symbols with binary phase shift keying (BPSK) or quadrature phase shift keying (QPSK) modulation and with unit amplitude. This method provides the best accuracy of power estimation with simple implementation. However, it should be noted that it is obvious to those skilled in the art that any other method may be implemented alternatively.

The noise power estimator $110_1$-$110_m$ estimates the noise power. Two options are provided for the noise power estimation in the present invention. In accordance with a first option, only pilot symbols are used to estimate the noise power. The noise power estimator $110_1$-$110_m$ receives pilot symbols from the selector $106_1$-$106_m$. The noise power for $m^{th}$ finger is estimated as follows:

$$\sigma_m^2 = \frac{1}{N_2} \sum_{k=1}^{N_2} |v_{N_1+k}^m|^2 - P_m. \qquad \text{Equation (2)}$$

In accordance with a second option, both pilot symbols and non-pilot symbols are used to estimate the noise power. The noise power estimator $110_1$-$110_m$ receives despread symbols from the despreader $104_1$-$104_m$. The noise power for $m^{th}$ finger is estimated as follows:

$$\sigma_m^2 = \frac{1}{N} \sum_{k=1}^{N} |v_k^m|^2 - \qquad \text{Equation (3)}$$
$$(\alpha_{data} G_{data} + \alpha_{TPC} G_{TPC} + \alpha_{TFCI} G_{TFCI} + \alpha_{pilot} G_{pilot}) P_m;$$

where $\alpha_{data}$, $\alpha_{TPC}$, $\alpha_{TFCI}$ and $\alpha_{pilot}$ are time percentage of data symbols, TPC symbols, TFCI symbols and pilot symbols occupied in one time slot. It is obvious that $\alpha_{data} + \alpha_{TPC} + \alpha_{TFCI} + \alpha_{pilot} = 1$. $G_{data}$ is the power offset of data symbol relative to pilot symbol. $G_{TPC}$ is the power offset of TPC symbol relative to pilot symbol. $G_{TFCI}$ is the power offset of TFCI symbol relative to pilot symbol. $G_{pilot} = 1$.

Third Generation Partnership Project (3GPP) standards specify the power offset relative to the data symbol. The power offsets (in dB) of TPC, TFCI and pilot symbols relative to data symbols are PO1, PO2 and PO3, respectively. Assume that po1, po2 and po3 are power offsets in linear that can be calculated as $poi = 10^{0.1 * POi}$, where $i=1,2,3$. Define $g_{TPC} = po1$, $g_{TFCI} = po2$ and $g_{pilot} = po3$. The power offsets relative to pilot symbols are then calculated as follows:

$$\begin{cases} G_{data} = 1/g_{pilot} \\ G_{TPC} = g_{TPC}/g_{pilot} \\ G_{TFCI} = g_{TFCI}/g_{pilot} \\ G_{pilot} = 1 \end{cases} \qquad \text{Equation (4)}$$

In a special case of $G_{data} = G_{TPC} = G_{TFCI} = 1$, the noise power can be simplified as follows:

$$\sigma_m^2 = \frac{1}{N} \sum_{k=1}^{N} |v_k^m|^2 - P_m. \qquad \text{Equation (5)}$$

The SNR estimator $112_1$-$112_m$ calculates SNR for each finger. The SNR for $m^{th}$ finger is estimated as follows:

$$SNR_m = \frac{P_m}{\sigma_m^2}. \qquad \text{Equation (6)}$$

The summer 114 combines the SNR estimates generated by the fingers. The overall SNR for all M fingers, (assuming that maximal ratio combining (MRC) Rake combining is utilized), is estimated as follows:

$$SNR_{all} = SNR_1 + SNR_2 + \ldots + S_{NRM}. \qquad \text{Equation (7)}$$

The apparatus 100 shown in FIG. 2 is configured to implement the second option in calculating the noise power estimation, (i.e., the noise power estimation is calculated using both pilot symbols and non-pilot symbols). In the case that the first option for calculating the noise power estimation is implemented, (i.e., only pilot symbols are used in estimation of noise power), the output from the selector $106_1$-$106_m$, instead of the output from the despreader $104_1$-$104_m$, is used in estimating the noise power.

Figure 3:
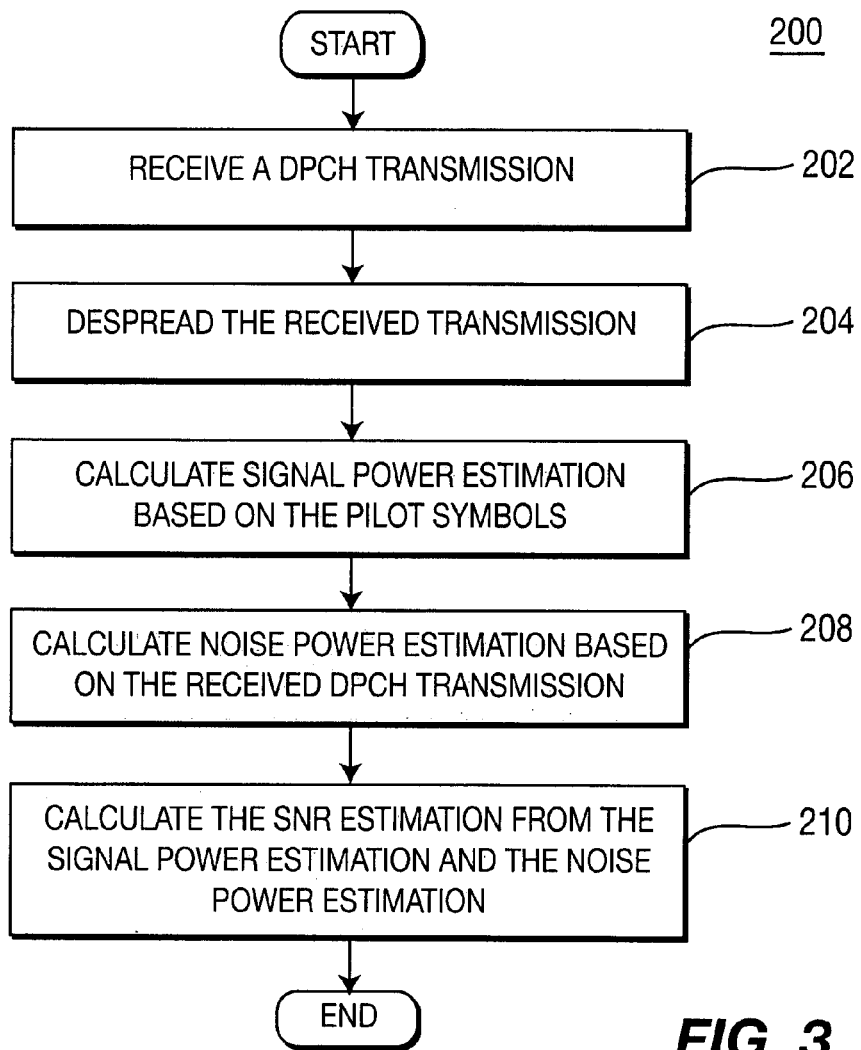
FIG. 3 is a flow diagram of a process for estimating SNR in accordance with the present invention.
Figure 4:
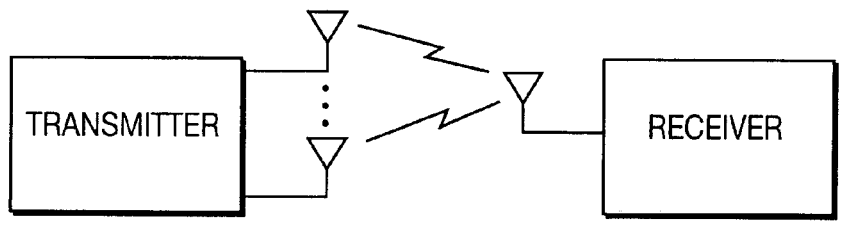
FIG. 4 shows a transmitter and a receiver wherein the transmitter implements a transmit diversity with a plurality of antennas.

When transmit diversity is used as illustrated in FIG. 4, the signal power estimation becomes as follows:

$$P_m = \left| \frac{1}{N_2} \sum_{k=1}^{N_2} v_{N_1+k}^m (s_{1,N_1+k}^m)^* \right|^2 + \left| \frac{1}{N_2} \sum_{k=1}^{N_2} v_{N_1+k}^m (s_{2,N_1+k}^m)^* \right|^2; \qquad \text{Equation (8)}$$

where $s^m_{1,N_1+k}$ ($1 \leq k \leq N_2$) are known pilot symbols from antenna 1 with BPSK or QPSK modulation and with unit amplitude, and $s^m_{2,N_1+k}$ ($1 \leq k \leq N_2$) are known pilot symbols from antenna 2 with BPSK or QPSK modulation and with unit amplitude. follows:

FIG. 3 is a flow diagram of a process 200 for estimating SNR in accordance with the present invention. DPCH transmissions are received (step 202) and despread to generate symbols including pilot symbols (step 204). Signal power estimation is calculated based on the pilot symbols (step 206). Noise power estimation is calculated based on either the pilot symbols or pilot and non-pilot symbols (step 208). The SNR estimation is calculated from the signal power estimation and the noise power estimation (step 210).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for estimating signal-to-noise ratio (SNR) based on dedicated physical channel (DPCH) transmissions, the DPCH transmission including pilot symbols, the method comprising:
    receiving a DPCH transmission;
    despreading the DPCH transmission to obtain transmitted symbols, the transmitted symbols including pilot symbols and non-pilot symbols;
    calculating signal power estimation based on the pilot symbols of the DPCH;
    calculating noise power estimation based on the pilot symbols and the non-pilot symbols of the DPCH; and
    calculating the SNR estimation from the signal power estimation and the noise power estimation.

2. The method of claim 1 wherein the signal power estimation, the noise power estimation and the SNR estimation are performed on at least two multipath components of the received transmission, and the SNR estimations of the multipath components are combined to generate a final SNR estimation.

3. The method of claim 1, wherein the DPCH transmission is transmitted using at least two antennas for transmit diversity.

4. The method of claim 1, wherein the noise power estimation is calculated based on time percentages of the pilot symbols and the non-pilot symbols in a time slot and power offsets of the pilot symbols and the non-pilot symbols.

5. An apparatus for estimating signal-to-noise ratio (SNR) based on dedicated physical channel (DPCH) transmissions, the DPCH transmission including pilot symbols, the apparatus comprising:

a despreader for despreading a received DPCH transmission to obtain transmitted symbols, the transmitted symbols including pilot symbols and non-pilot symbols;

a selector for selecting the pilot symbols of the DPCH;

a signal power estimator for calculating signal power estimation based on the pilot symbols of the DPCH;

a noise power estimator for calculating noise power estimation based on the pilot symbols and the non-pilot symbols of the DPCH; and a SNR estimator for calculating the SNR estimation from the signal power estimation and the noise power estimation.

6. The apparatus of claim 5 wherein the noise power estimator calculates the noise power estimation based on time percentages of the pilot symbols and the non-pilot symbols in a time slot and power offsets of the pilot symbols and the non-pilot symbols.

7. The apparatus of claim 5, wherein the DPCH transmission is transmitted using at least two antennas for transmit diversity and the signal power estimator calculates the signal power estimation by a summing signal power estimation for each transmit.

8. The apparatus of claim 5 wherein the apparatus is utilized in a wireless transmit/receive unit.

9. An apparatus for estimating signal-to-noise ratio (SNR) based on dedicated physical channel (DPCH) transmissions, the DPCH transmission including pilot symbols and non-pilot symbols, the apparatus comprising:

a plurality of delay units for aligning a plurality of multipath components of received DPCH transmission;

a plurality of despreaders for despreading the multipath components of the DPCH transmission to obtain transmitted symbols, the transmitted symbols including the pilot symbols and the non-pilot symbols;

a plurality of selectors for selecting the pilot symbols of the DPCH from the transmitted symbols;

a plurality of signal power estimators for calculating signal power estimation based on the pilot symbols of the DPCH;

a plurality of noise power estimators for calculating noise power estimation based on the pilot symbols and the non-pilot symbols of the DPCH;

a plurality of SNR estimators for calculating SNR estimations from the signal power estimations and the noise power estimations; and a summer for summing the SNR estimations.

10. The apparatus of claim 9 wherein the noise power estimator calculates the noise power estimation based on time percentages of the pilot symbols and the non-pilot symbols in a time slot and power offsets of the pilot symbols and the non-pilot symbols.

11. The apparatus of claim 9 wherein the DPCH transmission is transmitted using at least two antennas for transmit diversity and the signal power estimator calculates the signal power estimation by a summing signal power estimation for each transmit.

12. The apparatus of claim 9 wherein the apparatus is utilized in a wireless transmit/receive unit.

* * * * *

UNITED STATES PATENT AND TRADEMARK OFFICE
CERTIFICATE OF CORRECTION

PATENT NO. : 7,356,071 B2
APPLICATION NO. : 11/153967
DATED : April 8, 2008
INVENTOR(S) : Li et al.

It is certified that error appears in the above-identified patent and that said Letters Patent is hereby corrected as shown below:

At column 4, delete Equation 7, and insert therefor
--$SNR_{all} = SNR_1 + SNR_2 + \ldots + SNR_M$--.

At column 4, line 36, after the word "amplitude.", delete "follows:".

Signed and Sealed this

Fifteenth Day of July, 2008

JON W. DUDAS
*Director of the United States Patent and Trademark Office*